Oct. 23, 1956  H. H. CLUTE  2,767,552
FILL VALVE FOR LIQUEFIED PETROLEUM GAS TANKS
Filed March 11, 1955
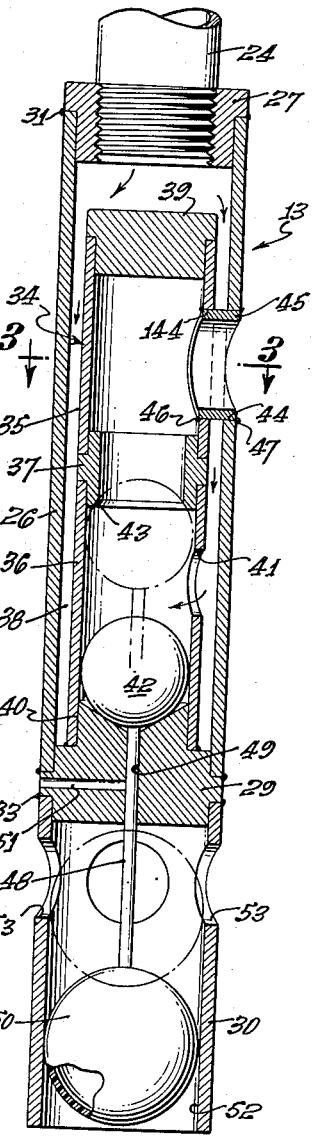
Henry H. Clute,
INVENTOR.
BY William P. Green
ATTORNEY.

United States Patent Office 2,767,552
Patented Oct. 23, 1956

2,767,552
FILL VALVE FOR LIQUEFIED PETROLEUM GAS TANKS

Henry H. Clute, San Mateo, Calif.

Application March 11, 1955, Serial No. 493,595

15 Claims. (Cl. 62—1)

This invention relates to improved valves for controlling the filling of fluids into a tank, and particularly adapted for controlling the filling of liquefied petroleum gas into a tank. In certain respects, the present invention constitutes an improvement on the valve structures shown in my copending application No. 384,095, filed October 5, 1953, on "Tank Filling Float Valve Structure."

As is well known, liquefied petroleum gases expand greatly in response to changes in temperature, and as a result it is necessary to always leave a substantial gas or "outage" space in the upper end of any tank containing such a fluid, so that the liquid may have sufficient space in which to expand without damage to the container. The present application, and my above mentioned prior application, are directed to the provision of float valve units which are adapted to automatically stop the filling of such liquified petroleum gases into a tank when the liquid level reaches a predetermined height, so that a proper and safe gas space is always maintained at the top of the tank. Preferably, the valve unit is adapted to be inserted into an operative position within a conventional tank and through the ordinary relatively small upper filling opening in the tank. For this purpose, the valve unit may be given a relatively small horizontal dimension, but an extended vertical dimension. For maximum facility in handling, the float valve unit may be attached to and carried by a manually actuated fill valve, with the fill valve and float valve being connectible into the filling opening of the tank as a unit.

The vertically extending body of the float valve unit is divided interiorly, by a suitable wall or walls, into two vertical passages. Fluid entering the tank through the upper end of the valve body flows first downwardly through one of these passages, and then upwardly through the second passage, to ultimately discharge from the valve body and into the tank through a suitable outlet opening in a wall of the body. In the body, there is provided a vertically movable float controlled valve element, which acts to control the flow of fluid upwardly through the second passage, preferably by coaction with a downwardly facing valve seat in the body, to thus shut off the flow of fluid into the tank when the liquid level reaches a predetermined height.

The present invention is in certain respects particularly concerned with the positioning of the float for controlling the valve element, at a location positively assuring against any unwanted actuation or movement of the float as a result of the flow of incoming fluild past or in close proximity to the float. For this purpose, the float is desirably located beneath the valve element itself, and preferably within a separate lower compartment in the body which communicates with the tank fluid. This lower compartment may be isolated from the two first mentioned vertical passages, which are contained in the body above the float compartment, with the two passages being separated from the lower compartment by a transverse partition in the body. The float may actuate the valve by means of a vertically extending rod, which extends and moves axially within an opening in the partition.

The above and other features and objects of the present invention will be better understood from the following detailed description of the typical embodiment illustrated in the accompanying drawing, in which:

Fig. 1 is a fragmentary vertical section taken through the upper portion of a liquefied petroleum gas tank, provided with a fill valve mechanism embodying the invention;

Fig. 2 is an enlarged fragmentary vertical section taken on line 2—2 of Fig. 1;

Fig. 3 is a horizontal section taken on line 3—3 of Fig. 2; and

Fig. 4 is a fragmentary vertical section through a variational form of float valve unit.

I have shown at 10 in Fig. 1 a conventional upstanding essentially cylindrical tank, into which liquefied petroleum gas or other fluid is to be filled under pressure to a predetermined liquid level L. The upper end of tank 10 contains the usual threaded vertically extending filling and dispensing opening 11, into which an upper control valve unit 12 is threadedly connected. This valve unit 12 carries at its lower end a liquid level responsive automatic float valve unit 13, which projects downwardly into the tank.

Valve unit 12 includes a valve body 14 whose lower tubular externally threaded vertically extending portion 15 is connected into the upper threaded opening 11 of the tank. Body 14 has at one side a laterally projecting tubular portion 16, to which a filling line 17 may be removably connected, for filling liquefied petroleum gas into the tank. The flow of fluid into the tank from line 17 is controlled by a valve element 18 seating against a seat 19 in body 14 and threadedly connected at 20 into the body. An upper rotary handle 21 controls the opening and closing movement of valve 18.

At an opposite side, valve body 14 has a second laterally projecting portion 22, to which is connected a relief valve 23 acting to allow escape of fluid from within the valve body in the event of attainment of an excessive fluid pressure. To cite a typical example, this relief valve may be constructed to discharge fluid from the valve body and tank at a pressure of about 375 p. s. i., while the filling pressure in line 17 is ordinarily about 175 p. s. i., and the gas pressure in the upper portion of tank 10 when filled is about 160 p. s. i.

Float control valve 13 comprises a vertically elongated unit of a diameter not greater than, and preferably smaller than, the internal diameter of threaded opening 11 in the tank, so that unit 13 may be withdrawn upwardly through the tank opening with upper valve 12. Unit 13 is connected to the lower end of body 14 of valve 12 by a tubular threaded nipple 24, which is threadedly connected at its upper end into an internally threaded bore 24 within lower tubular portion 15 of body 14.

As best seen in Fig. 2, unit 13 includes an outer vertically extending rigid cylindrical tubular body or pipe 26, partially closed at its upper end by an annular head 27 into which the lower end of nipple 24 is threadedly connected at 28. At its lower end, tubular body 26 is closed by a transverse or horizontal wall 29, which carries at its underside a vertical tube 30 of a diameter corresponding to body 26. The upper head 27, partition 29, and tube 30 are all rigid and fastened in fixed relation to tube 26, as by welding at 31, 32 and 33.

Contained within outer tubular body 26, I provide a second vertically extending but smaller diameter cylindrical tube or pipe 34, typically formed of two vertically alined sections 35 and 36 and an intermediate annular valve seat section 37, sections 35, 36 and 37 are of course all rigid, and rigidly welded or otherwise secured together.

The sectionally formed inner tube 34 is mounted concentrically within outer tube 26, to provide radially between tubes 26 and 34 an annular fluid passage 38 extending along the entire height of the inner tube. The upper end of inner tube 34 is closed by an upper transverse head 39, while the lower end of tube 34 is received about and secured in fluid tight relation to an upper reduced diameter portion 40 of wall 29. In filling tank 10, fluid flows downwardly from nipple 24 through space 38 between tubes 26 and 34, and then flows into the inner tube 34 through an opening 41 in a side of its lower section. From this opening, the fluid flows upwardly within inner tube 34 and past valve seat number 37, under the control of a vertically movable spherical ball valve 42 which is movable upwardly to a closed position of annular engagement the downwardly facing inclined annular valve seat surface 43 formed at the lower end of seat member 37. In its lower open full line position of Fig. 1, ball valve 42 is received within the bottom of inner tube section 36, at a location beneath fluid opening 41, so that the ball valve is shielded sufficiently from the fluid entering the inner tube through opening 41 to prevent closing of the valve solely as a result of the fluid movement.

At a location above seat member 37, tubes 26 and 34 have a pair of registering correspondingly shaped side openings 144 and 44, into which there is connected a short horizontal tube 45 for passing liquid laterally outwardly from the inner tube and into tank 10. Outlet tube 45 is of course annularly sealed to both the inner and outer tubes, as by welding at 46 and 47, to effectively close off any direct leakage of fluid between this tube and space 38.

Valve 42 is connected in fixed relation to a vertically elongated and vertically extending rigid rod 48, which extends downwardly through a central vertical passage 49 in partition 29 to a point of rigid attachment to a lower spherical ball float 50 in tube 30. Float 50 may be only slightly smaller than the internal diameter of tube 30, to be freely vertically movable therein. A small transverse passage 51 may extend horizontally within partition 29 from its central passage 49 to a side of the partition, to allow any slight leakage of liquid which may flow downwardly along rod 48 to drain off laterally through passage 51 rather than downwardly into the float chamber formed by tube 30. The liquid level within the float chamber formed in lower tube 30 changes in correspondence with the liquid level changes in the tank 10, since the tank liquid is free to flow into and out of the float chamber through both the open lower end 52 of tube 30, and a number of openings 53 in the side of tube 30 near its upper end and at locations of communication with the upper side of the float.

As will be understood, the filling of liquid into tank 10 through float valve unit 13 is controlled by vertical movements of the bodily movable valve and float unit comprising valve 42, rod 48, and float 50. The float 50 has a specific density which is considerably less than the specific density of the liquid being filled into the tank, so that the float 50 and parts 42 and 48 will float on the liquid with element 50 only partially submerged. As a result, float 50 automatically moves valve 42 upwardly to a closed position of engagement with seat 43 upon the attainment of a predetermined liquid level in tank 10. That predetermined level will typically be the level indicated at L, at which float 50 is partially submerged in the liquid and the upper valve 42 is entirely out of the liquid. For best results, float 50 may comprise a hollow sphere, typically formed of a suitable resinous plastic material adapted to withstand the liquid being used. For example, this hollow sphere may be formed of polymerized methyl methacrylate, such as that sold by E. I. du Pont de Nemours under the trade name Lucite.

In filling a tank 10 provided with the above described valve mechanism, the filling line 17 is first connected to fitting projection 16, valve 18 is then opened, and liquefied petroleum gas or other fluid is filled under pressure from line 17 through the valve mechanism and into the tank. This fluid passes downwardly along space 38 within the float valve unit 13, and then passes into inner tube 34 through opening 41, upwardly through tube 34 and ultimately out tube 45 and into the tank. When the liquid within the tank reaches the level L, the buoyancy of float 50 shifts valve 42 upwardly to engage seat 43 and thus prevent the filling of further liquid into the tank. The float valve unit in this way prevents filling of the tank above the level L, so that a gas space is always maintained in the upper portion of the tank, to allow for expansion of the liquid within the tank as a result of temperature changes. Such allowance for liquid expansion is extremely important where the liquid being used is liquefied petroleum gas.

After completion of the filling process, valve 18 may be closed to retain the filled fluid within the tank. The fluid may then be dispensed from the tank under the control of valve 18 by reverse flow through valve units 13 and 12, and line 17 which then becomes a dispensing line. Upon such reverse fluid flow through the float valve unit 13, the fluid entering tube 34 through tube 45 exerts a downward opening force on valve 42, allowing the fluid to pass seat 43 and flow through opening 41 and then upwardly through passage 38 to the upper valve 12.

When the tank is empty, the valves 12 and 13 may be removed from tank 10 as a unit, by reason of the formation of lower valve unit 13 of the illustrated vertically elongated configuration. Such removal of the valves permits their ready repair or replacement, and facilitates access to the interior of tank 10.

Fig. 4 illustrates fragmentarily a variation form of float valve unit 13a, which may be utilized in lieu of the unit 13 of Fig. 1. This second form of valve unit 13a may be considered as substantially identical to unit 13 except as to the provision in Fig. 4 of a check valve 39a in the upper end of inner tube 34a, in place of the imperforate upper wall 39 shown in Fig. 2. This check valve 39a seats downwardly against an annular seat member 60 which is rigidly connected into the upper end of tube 34a. Stem 61 of check valve 39a is guided for vertical reciprocation by passage through a vertical opening 62 in a fluid passing cage or transverse web member 63 attached to seat member 60.

During filling of fluid into the tank 10 through valve unit 13a of Fig. 4, check valve 39a automatically seats downwardly against member 60, to require passage of the filling fluid downwardly through space 38a between tubes 26a and 34a, and then upwardly through inner tube 34a in the manner described previously. When, however, gas is to be withdrawn from the upper end of the tank, the gas may pass upwardly past check valve 39a and directly into the upper valve unit 12, without the necessity for passage through space 38a. It will be understood that the valve 39a or its equivalent might be positioned differently, as long as it provided for one way communication between the upper gas space within tank 10 and the upper valve unit 12 or another gas dispensing fitting.

What is claimed is:

1. An automatic fill valve assembly for connection into an upper filling opening of predetermined size in a liquefied petroleum gas tank, comprising a vertically extending hollow body to be received in said tank, means at an upper inlet end of said body having a threaded connector portion adapted for threaded connection to said predetermined size of filling opening, said body being vertically elongated and having a small enough horizontal dimension to be insertible into and withdrawable from the tank through said predetermined size of filling opening, wall means within said body dividing it interiorly into a first passage through which fluid passes downwardly within the body from said upper inlet end thereof and a second passage through which fluid flows upwardly within the body from a lower portion of said first passage, an outlet in a wall of said body through which said fluid flows from said second passage into the tank, a vertically movable valve in the body controlling the fluid flow upwardly through said second passage, and float means beneath said valve exposed to the fluid in said tank and controlling the actuation of said valve to close the valve upon attainment of a predetermined liquid level in the tank.

2. An automatic fill valve assembly as recited in claim 1, in which said float means are contained in said body beneath said valve.

3. An automatic fill valve assembly as recited in claim 1, in which said float means comprise a float spaced vertically beneath said valve, there being a rod extending vertically between said valve and float and movable vertically to actuate the valve in response to vertical movement of the float.

4. An automatic fill valve assembly as recited in claim 1, in which said body contains a bottom chamber beneath said valve communicating directly with the tank but isolated from said passages, said float means comprising a float which is vertically movable in said chamber.

5. An automatic fill valve assembly as recited in claim 4, including a generally horizontal partition separating said chamber from said passages, there being a rod extending vertically between said valve and float and through an opening in said partition and movable vertically to actuate the valve in response to vertical movement of the float.

6. An automatic fill valve assembly as recited in claim 5, in which said bottom chamber comprises essentially a vertically extending tube having a bottom open end communicating with the tank, and having a side opening communicating with the tank above said float.

7. An automatic fill valve assembly as recited in claim 1, including means forming an essentially downwardly facing valve seat in said second passage against which said valve seats upwardly.

8. An automatic fill valve assembly for connection into a liquefied petroleum gas tank, comprising a vertically elongated tubular outer body connectible at its upper end to a filling fitting, a tubular inner body extending vertically within said outer body, said inner body dividing said outer body interiorly into a first passage radially between the two bodies through which fluid flows downwardly from said filling fitting, and a second passage within the inner body through which fluid flows upwardly from a lower portion of the first passage, outlet means in the side walls of said tubular bodies through which fluid from said second passage discharges laterally into the tank, means forming an essentially downwardly facing valve seat extending about a portion of said second passage, a valve seating upwardly against said seat and controlling fluid flow upwardly through said second passage, and a float beneath said valve exposed to the fluid in said tank and controlling actuation of said valve to close the valve upon attainment of a predetermined liquid level in the tank.

9. An automatic fill valve assembly as recited in claim 8, in which said inner body has a side wall opening through which liquefied petroleum gas flows from said first passage to the second, said seat being formed in said inner body above said side wall opening.

10. An automatic fill valve assembly as recited in claim 9, in which said valve is movable downwardly in said inner body to a location beneath said side wall opening and out of the path of liquid flowing from said opening upwardly in the inner body.

11. An automatic fill valve assembly as recited in claim 8, including an essentially horizontal partition extending across the lower ends of said inner and outer tubular bodies, said float being located beneath said partition in direct communication with the tank.

12. An automatic fill valve assembly as recited in claim 11, including means forming a bottom float chamber beneath said partition containing said float and communicating directly with the tank, there being a rod extending vertically between and interconnecting said float and valve and extending through an opening in said partition and acting to move said valve vertically in response to vertical movement of said float.

13. An automatic fill valve assembly as recited in claim 12, in which said inner body has a side wall opening through which liquefied petroleum gas flows from said first passage to the second, said seat being formed in said inner body above said side wall opening, and said valve being movable downwardly in said inner body to an open position lower than said side wall opening and out of the path of fluid flow.

14. An automatic fill valve assembly for connection into a liquefied petroleum gas tank, comprising a vertically extending hollow body adapted to pass through a fill opening in the tank and connectible at an upper inlet end to a filling fitting, wall means within said body dividing it interiorly into a first passage through which fluid passes downwardly within the body from said upper inlet end thereof and a second passage through which fluid flows upwardly within the body from a lower portion of said first passage, an outlet in a wall of said body through which said fluid flows from said second passage into the tank, a vertically movable valve in the body controlling the fluid flow upwardly through said second passage, and float means beneath said valve exposed to the fluid in said tank and controlling the actuation of said valve to close the valve upon attainment of a predetermined liquid level in the tank, said body comprising a vertically extending outer tube, and said wall means comprising a vertically extending inner tube within and spaced from said outer tube to form one of said passages within the inner tube, and the other passage between said inner and outer tubes.

15. An automatic fill valve assembly as recited in claim 1, in which said hollow body is externally of vertically extending substantially cylindrical configuration along the major portion of its vertical extent to facilitate its passage through said opening.

References Cited in the file of this patent

UNITED STATES PATENTS

| | | |
|---|---|---|
| 85,386 | Hunter | Dec. 29, 1868 |
| 341,203 | Aderhold | May 4, 1886 |
| 385,387 | Thompson | July 3, 1888 |
| 1,502,601 | Sampson | July 22, 1924 |
| 1,633,581 | Gordon | June 28, 1927 |
| 2,022,443 | Stollberg | Nov. 26, 1935 |